United States Patent

Sakai et al.

[11] Patent Number: 5,851,619
[45] Date of Patent: Dec. 22, 1998

[54] LAMINATED MOLDED ARTICLE AND ITS PRODUCTION METHOD

[75] Inventors: Hideo Sakai; Kojiro Motai; Satoru Kishi; Katsuyuki Morita; Nobuyuki Hosoyama; Hiroshi Tanabe, all of Kanagawa-Ken, Japan

[73] Assignee: Mitsui Chemicals, Inc., Tokyo, Japan

[21] Appl. No.: 196,197

[22] PCT Filed: Aug. 6, 1993

[86] PCT No.: PCT/JP93/01108

§ 371 Date: May 31, 1994

§ 102(e) Date: May 31, 1994

[87] PCT Pub. No.: WO94/03322

PCT Pub. Date: Feb. 17, 1994

[30] Foreign Application Priority Data

Aug. 7, 1992 [JP] Japan ................................. 4-211787

[51] Int. Cl.$^6$ ............................. B29C 67/14; B32B 3/00
[52] U.S. Cl. ........................ 428/57; 428/34.7; 428/36.9; 156/173; 156/174; 156/175; 156/177; 156/189; 156/190; 156/191; 156/195; 156/255; 156/446
[58] Field of Search ................... 428/35.9, 246, 428/34.7, 36.9, 57; 156/189, 190, 191, 173, 174, 175, 177, 195, 255, 446

[56] References Cited

U.S. PATENT DOCUMENTS

| | | |
|---|---|---|
| 4,990,207 | 2/1991 | Sakai et al. . |
| 4,992,127 | 2/1991 | Kishi et al. . |
| 5,071,687 | 12/1991 | Shigetoh ............................. 428/35.9 |
| 5,201,979 | 4/1993 | Koba et al. . |
| 5,294,394 | 3/1994 | Sakai et al. . |
| 5,445,701 | 8/1995 | Koba et al. . |
| 5,514,448 | 5/1996 | Kishi et al. . |
| 5,532,054 | 7/1996 | Koba et al. . |

FOREIGN PATENT DOCUMENTS 3742852  7/1989  Germany .

OTHER PUBLICATIONS

Handbook of Polymer Composites, Section 3.4, J Barnes Continuous Fibre Reinforced Thermoplastic Composites pp. 145–149.

*Primary Examiner*—Richard Weisberger
*Attorney, Agent, or Firm*—Burns, Doane, Swecker & Mathis, L.L.P.

[57] ABSTRACT

A hollow and cylindrical laminated molded product which is constituted by mutually overlapped joining of edge sides in a longitudinal direction of at least one or more elongated laminated articles formed by layered lamination of fiber-reinforced thermoplastic resin plates containing reinforcing fibers of not less than 30% and not more than 85% in volume content, and a method of producing the above-mentioned laminated molded product using a simple molding tool.

11 Claims, 5 Drawing Sheets

LAMINATED MOLDED ARTICLE AND ITS PRODUCTION METHOD

TECHNICAL FIELD

The present invention relates to a hollow laminated molded article composed of a fiber-reinforced thermoplastic resin and a method for producing it.

BACKGROUND ART

In the prior art, a molded article made of resin is mainly formed by laminating fiber-reinforced low molecular weight thermosetting resin plates and heating and molding them.

However, the thermosetting resin has a low molecular weight, so that there is such a problem that the resin generates odors such as a styrene monomer odor in the case of an unsaturated polyester resin and an amine odor in the case of an epoxy resin during production operation, and adverse effects are exerted on human bodies.

In addition, also during the lamination, the resin is not integrated with reinforcing fibers, so that they are apt to deviate during the molding, and wrinkles are apt to occur. Thus, a considerable degree of technical skill is required for the molding, and a considerable period of time is also required for curing of a molded article, so that there are such problems that such a molding apparatus becomes extremely expensive, and production cost also increases.

Thus, production of molded articles has been tried using fiber-reinforced resin plates including thermoplastic resins which can be relatively easily handled.

As an illustration of molding using the thermoplastic, in addition to the method described in an official gazette of Japanese Patent Laid-open Application No. 1-286823 entitled "Continuous shaping method and its apparatus for fiber-reinforced resin molded articles", there is generally known a method in which fiber-reinforced resin plates are heated and softened followed by pressurizing and molding at a high pressure in a mold using a pressing machine, that is a press molding method in which a predetermined number of the fiber-reinforced resin plates are laminated on a surface of a male mold or a female mold, the molds are closed to perform pressurizing while heating them to not less than a temperature capable of fluidization of the resin, followed by cooling to not more than a melting temperature of the resin and performing mold release, and an autoclave molding method in which laminated fiber-reinforced resin plates are introduced into a mold, they are heated to not less than a temperature capable of fluidization under vacuum to perform shaping and deaeration, and thereafter the temperature in the mold is lowered to room temperature to perform mold release and the like.

In these methods, generally it is possible to produce a shell-shaped molded article such as for example one having a box shape, a dish shape and the like in which a cross-sectional shape of the molded article is an open curve, however, it is impossible to produce a hollow and cylindrical molded article in which a cross-section is a closed curve.

As a method for producing such a hollow and cylindrical molded article, there is a method in which a laminated article of fiber-reinforced resin plates is prepared in which a resin is melted and is wound around a core mold to perform molding, the resin is introduced into a mold together with the core mold, and is pressurized while heating using a pressing machine or under vacuum, followed by cooling to take out the molded article, and the core mold is withdrawn.

However, a high degree of technical skill is required for winding the laminated article around the core mold so as not to make wrinkles and sagging, and a long period of time is required for the steps of heating while performing the pressurizing followed by the cooling, so that the problem is such that production cost becomes expensive.

Thus, generally the hollow and cylindrical molded article is produced in such a manner that it is divided into a plurality of parts to perform molding, they are assembled to provide a hollow and cylindrical body, and their side edges are mutually joined using bolts and nuts or an adhesive, or their joining faces are heated to obtain adhesion under pressure.

However, in such a method, it is necessary that a plurality of parts are individually molded and assembled, and their side edges are mutually joined, so that there is such a problem that production steps become complicated.

In addition, in the case of the mechanical joining method by bolts and nuts and the like, stress is concentrated on the joined portions, so that there is such a problem that a reinforcing member must be provided depending on use, while in the case of the chemical joining method by the adhesive and the like, there is such a problem that interfacial peeling-off takes place, and further there is such a problem that an adhesive suitable for polypropylene resins does not exist.

In addition, in the case of the method of heating and melting to cause adhesion under a pressure, there are methods such as a method in which ultrasonic waves are used, a method in which frictional heat generated by imparting vibration to the joining face is used, a method in which a hot plate is used and the like, however, there are such problems that in the case of the method in which ultrasonic waves are used, the temperature at the joining face cannot be raised when the joining portion has a thickness of not less than 0.5 mm, and in the case of the method in which frictional heat is used, the strength as a whole is lowered because the reinforced fibers at the joining face may be damaged, and further in the case of the method in which the hot plate is used, the resin at other portions than the joining face is also melted, and nonuniformity in strength is generated resulting in decrease in a strength as a whole, wherein it is difficult to produce a hollow and cylindrical molded article at a low cost without deteriorating the strength.

SUMMARY OF THE INVENTION

An object of the present invention is to provide a laminated molded article of fiber-reinforced thermoplastic resin plates and its production method in which production can be performed simply without using bolts and nuts or an adhesive and without deteriorating the strength of joining faces when the hollow fiber-reinforced thermoplastic resin molded article is produced.

The above-mentioned object is achieved by a hollow and cylindrical laminated molded product, wherein said product comprises at least one or more elongated laminated articles, said articles being formed by layered lamination of fiber-reinforced thermoplastic resin plates containing reinforcing fibers of not less than 30% and not more than 85% in weight content, said plates being able to be molded at a relatively low pressure, edge portions in a longitudinal direction of said articles (1, 2) being mutually overlapped and joined.

Thus, the laminated molded product is obtained by a production method for laminated products comprising:

a step in which at least one or more laminated articles formed by layered lamination of fiber-reinforced thermoplastic resin plates containing reinforcing fibers of not less than 30% and not more than 85% in weight content capable of low pressure molding are heated, so that a thermoplastic resin thereof is allowed to be in a melted state to perform deaeration of air contained between layers;

a step in which the laminated articles in which said thermoplastic resin is in the melted state are arranged around a molding tool having a desired cross-sectional shape;

a step in which said laminated articles are closely contacted with an outer peripheral surface of the molding tool so that the molding tool is wrapped in a state in which side edge portions of each of the laminated articles are mutually overlapped with side edge portions of the other adjoining laminated article to provide closing in a loop shape, and the laminated articles are mutually joined and integrated, and a step in which said integrated laminated articles are cooled.

Incidentally, it is recommended that a hollow molding tool having venting holes at circumferential walls is used as the molding tool, and in the process of cooling said article after completion of the step in which the heated laminated articles are closely contacted with the outer peripheral surface of the molding tool and integrated, while the laminated articles have a temperature of not more than a melting point and not less than a softening point of the thermoplastic resin, compressed air is supplied to the inside of the molding tool, air emitted from the venting holes is used to form an air layer between the outer peripheral surface of the molding tool and an inner circumferential face of the laminated article so as to release the integrated molded article from the outer peripheral surface of the molding tool, and thereafter the molding tool is withdrawn.

DESCRIPTION OF THE PREFERRED EMBODIMENTS OF THE INVENTION

Figure 1:
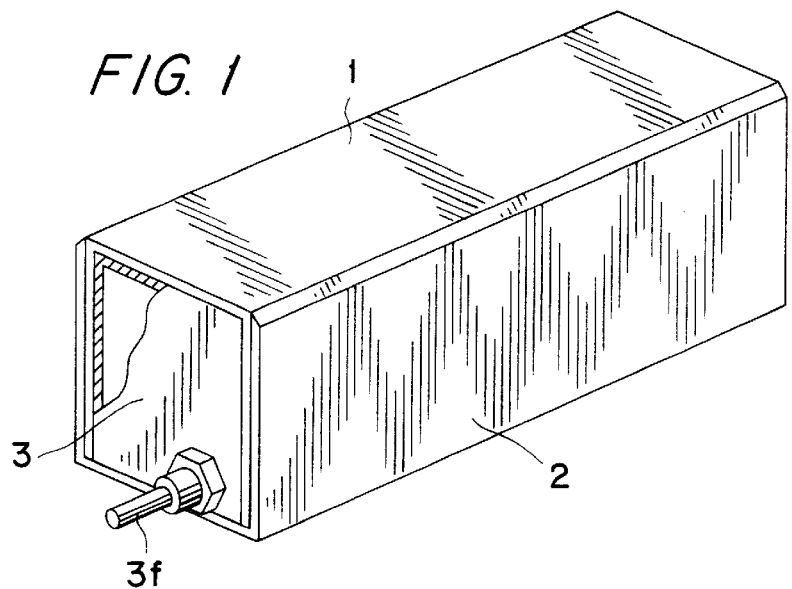
FIG. 1 is a perspective view showing one example of a square sectional molded product obtained by a method of the present invention.

As a material for molding used in the present invention, a unidirectional fiber-reinforced thermoplastic resin plate (hereinafter referred to as prepreg) in which fiber sheets in which continuous fibers are stretched and aligned in one direction are used as a reinforced material into which a thermoplastic resin capable of low pressure molding is impregnated, or a multi-directional fiber-reinforced thermoplastic resin plate (hereinafter referred to as prepreg) in which the above-mentioned resin is impregnated into woven cloth such as plain weave, satin weave, twill weave and the like may be used. These prepregs are laminated alone or in combination to give a desired fiber orientation and a thickness, and these laminated articles are heated and compressed beforehand prior to a molding step, thereby deaeration of air existing between the prepregs becomes possible, and physical properties of an obtained molded product can be improved.

The thickness of the prepreg is usually about 0.05 mm to 1 mm, however, if it is too thin, the prepreg becomes easily torn during lamination, the number of sheets of lamination becomes large, and the operation efficiency becomes bad, while if it is too thick, repulsive force of each layer becomes large resulting in difficulty in bending when molding is performed along a molding tool, and good shaping becomes impossible, so that it is desirable that those to be used in the present invention are not less than 0.08 mm and not more than 0.6 mm.

As the fiber to serve as the above-mentioned reinforced material can be exemplified synthetic resin fiber such as glass fiber, carbon fiber, aramid fiber (registered trade mark: Kevlar and the like) and the like, inorganic fiber such as silicon carbide fiber and the like, metallic fiber such as titanium fiber, boron fiber, stainless steel fiber and the like. There is, however, no limitation thereto.

On the other hand, as the thermoplastic resin to be impregnated between the above-mentioned reinforced material and fibers, there can be impregnated polystyrene, polyvinyl chloride, high density polyethylene, polypropylene, polycarbonate, polybutylene terephthalate, polyethylene terephthalate, polyether sulfone, polysulfone, polyether imide (trade mark: "ULTEM"), polyether ether ketone, polyphenylene sulfide and the like. There is again no limitation thereto.

In the present invention, the above-mentioned heating step is provided before a shaping step of the laminated article, which has roles of performing deaeration between the prepregs and giving sufficient heat to make processing in the next step easy to the laminated article. Namely, the molding method for the fiber-reinforced thermoplastic resin laminated article having a closed cross-sectional shape intended to be obtained in the present invention resides in a method in which the thermoplastic resin is in a heated and melted state, and the laminated article uses the heat possessed by itself to be welded to and integrated with the other laminated article.

Generally, a thermoplastic resin plate containing no reinforcing fiber cannot hold its flatness in a heated and melted state, and it is still more difficult to perform shaping. Therefore, in such a case, shaping is performed in a closed mold, or shaping is performed in a state of softening at not less than a melting point of the thermoplastic resin. However, in the case of the fiber-reinforced resin laminated article of the present invention, the resin is impregnated in a three-dimensional structure of fibers constituted by the prepregs laminated in a layered state, so that even when the thermoplastic resin is melted, and a fluidization state is given with the resin alone, then the shape of the laminated article is maintained, and thus it becomes possible to apply external force to the laminated article to perform shaping in the shaping step of the next step. Further, the thermoplastic resin maintains its melted state also after the shaping, so that when another laminated article in the same state is allowed to adhere under pressure, the thermoplastic resins at a joining face are mutually welded, and when cooling and solidification are performed thereafter, the joining face between the two laminated articles is completely integrated, and it is possible to form the joining face having a high strength which is the same in quality as portions of the laminated articles other than the joining face.

Therefore, with respect to the above-mentioned laminated article of the prepregs, if the weight content of the fiber is less than 30%, the fluidization of the resin is so remarkable that no suitable shaping can be performed, while if the volume content of the fiber exceeds 85%, an amount of the resin capable of being contained becomes too small, and thus no desirable molded product can be obtained. Therefore, as the fiber-reinforced thermoplastic resin plates for constituting the laminated article used in the present invention, those containing not less than 30% and not more than 85% of the reinforcing fibers in weight content are preferable, and more desirably those having a weight content of fibers of 40 to 80% have suitable molding and processing properties, so that a desirable molded product can be obtained when such one is used.

In addition, since the shaping and the joining are performed while the thermoplastic resin of the laminated article is melted, so that a suitable resin viscosity is required for the resin, however, if the viscosity is too low, the resin outflows from interstices between the reinforcing fibers, and the arrangement of the fibers is disarranged, while if it is too high, it becomes difficult to perform molding, so that it is recommended that the viscosity is not less than 100 poise and not more than 5000 poise.

A method of the present invention will be explained hereinafter with reference to the drawings.

In the drawings, 1 and 2 depict an upper laminated article and a lower laminated article respectively in which the thermoplastic resin is in a melted state, 3 depicts a hollow molding tool having a square-section cylindrical shape placed laterally in which both end faces are closed, 4 and 4' depict claw-like plates for molding which are provided along both side faces of the molding tool 3 and make reciprocal movement upwardly and downwardly so as to allow their both sides to closely contact with both side edges of the upper laminated article 1, 5 indicates lifting up plates for molding the lower laminated article 2, 6 depicts an air layer, 1' depicts the upper laminated article in which the thermoplastic resin is in a softened state, and 2' is the lower laminated article in which the thermoplastic resin is in a softened state.

Figure 2:
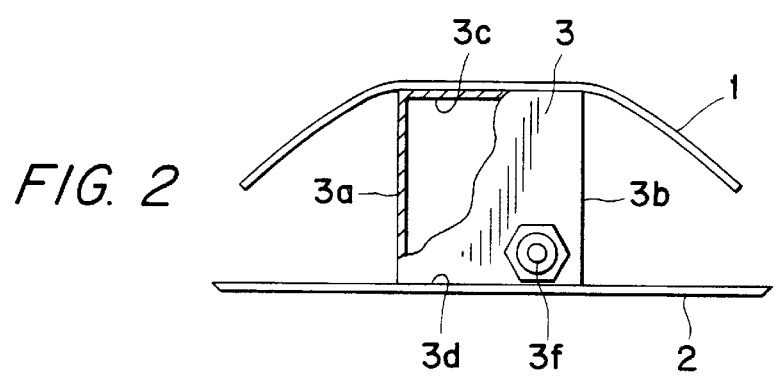
FIG. 2 is an explanatory view showing a state in which two sheets of molded articles are arranged at mutually opposing positions at the outside of a molding tool.

In the meantime, with respect to the upper laminated article 1 which is arranged while contacting an upper face 3c of the molding tool 3 as shown in FIG. 2 and the lower laminated article 2 which is arranged while contacting a lower face 3d of the molding tool 3, as described above, the air existing between the prepregs is removed beforehand during a heating step prior to making the arrangement, and an amount of heat such that makes it possible to make welding after shaping of the laminated articles 1 and 2 is given. The laminated articles are heated to a temperature not less than a glass transition point of the thermoplastic resin.

At this time, neighboring portions of the both side edge portions of the upper laminated article 1 arranged at the upper portion of the molding tool 3 are bent downwardly to thereby slightly approach both side faces 3a and 3b of the molding tool 3.

Figure 3:
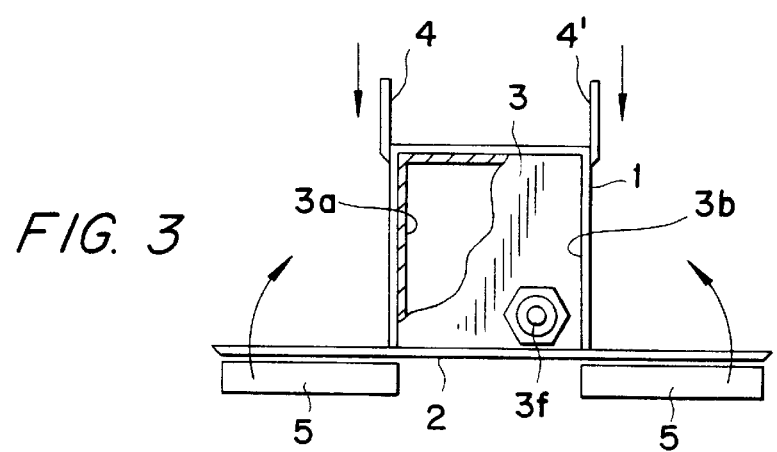
FIG. 3 is an explanatory view showing a procedure in which the upper molded article shown in FIG. 2 is allowed to abut against side faces of the molding tool and the lower molded article is overlapped thereon.
Figure 4:
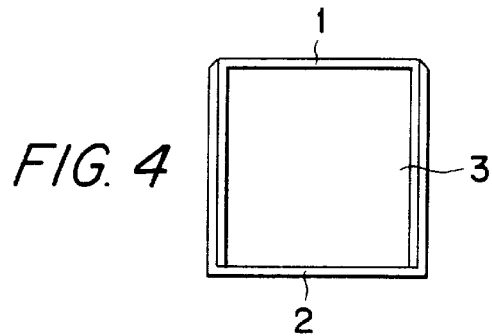
FIG. 4 is an explanatory view showing a state in which the upper laminated article and the lower laminated article are welded.

Next, as shown in FIG. 3, the claw-like plates 4 and 4' are lowered, the upper laminated article 1 is bent along the molding tool 3, its both side edges are closely contacted with the both side faces 3a and 3b of the molding tool 3, subsequently the claw-like plates 4 and 4' are raised, thereafter the lifting up plates 5 are rotated so as to fold and overlap both side edges of the lower laminated article 2 along both side edges of the upper laminated mold 1, and as shown in FIG. 4, overlapped portions of the upper laminated article 1 and the lower laminated article 2 are allowed to adhere under a pressure.

In such a manner as described above, both side edges of the laminated articles 1 and 2 are mutually welded to form a hollow and cylindrical body followed by cooling and solidification, thereby it is possible to obtain a hollow and cylindrical molded product of the fiber-reinforced thermoplastic resin laminated article.

In the meantime, when the molded product as described above is mass-produced, it is desirable to make it possible to repeatedly utilize the molding tool 3, so as to make it possible to easily withdraw the molded product from the molding tool 3.

Figure 5:
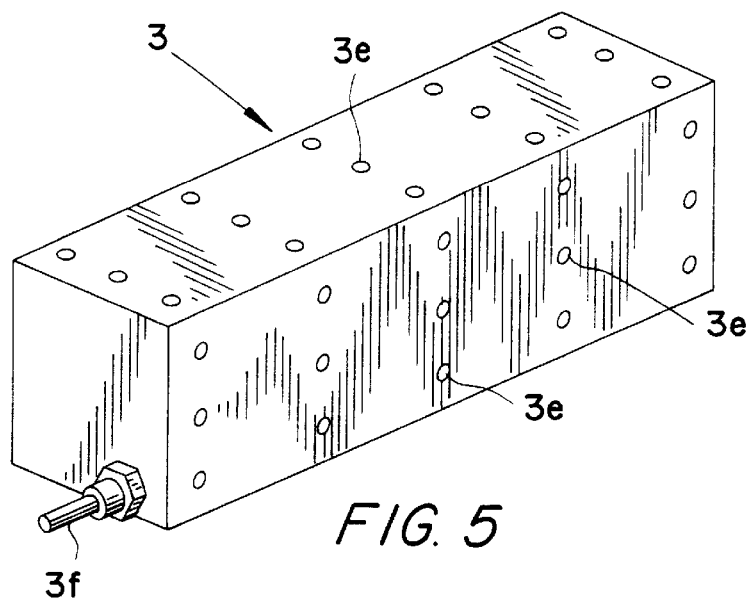
FIG. 5 is a perspective view of a molding tool having venting holes.
Figure 6:
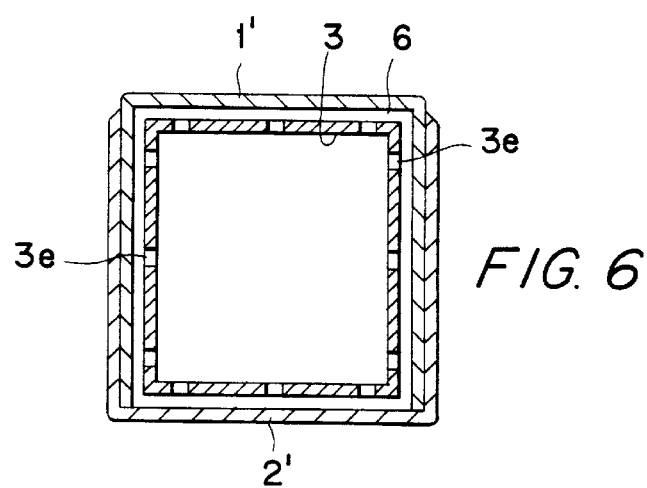
FIG. 6 is a cross-sectional view showing a state in which the molding tool having the venting holes is used to weld and integrate two laminated articles, thereafter compressed air is introduced into the molding tool, and an air layer is formed between an outer peripheral surface of the molding tool and an inner circumferential surface of the laminated article.

Thus, as shown in FIG. 5, a large number of venting holes 3e are provided at circumferential walls of the molding tool 3, an air injection port 3f for injecting compressed air into the molding tool 3 is provided at one end face, and the compressed air is injected through the air injection port 3f into the molding tool 3 when the temperature of the hollow and cylindrical molded product provided around the molding tool 3 is lowered to not more than a melting point and not less than a softening point. In such a case, the compressed air passes through the venting holes 3e of the molding tool 3 and penetrates into an interstice between an outer peripheral surface of the molding tool 3 and an inner circumferential surface of the molded article, and the air layer 6 is formed as shown in FIG. 6, so that of the molded product from the molding tool 3 can be easily released.

Examples of the present invention will be explained hereinafter in comparison with Comparative Examples.

[EXAMPLE 1]

Using the above-mentioned method, a laminated molded product was produced on the basis of the following production conditions.

[Production Conditions]
Thermoplastic resin: polypropylene
Reinforcing fiber: glass fiber
Fiber content: 50% (in weight)
Prepreg thickness: 0.188 mm
Number of laminated prepregs: 16 sheets
Thickness of laminated article: 3 mm
Heating temperature: 250° C. for 5 minutes
Resin viscosity at the heating temperature: 1500 poise In this example, a good molding product having a closed cross-section was obtained.

[COMPARATIVE EXAMPLE 1]

A laminated molded product was produced in the same manner as Example 1 on the basis of the following production conditions.

[Production Conditions]
Thermoplastic resin: polypropylene
Reinforcing fiber: glass fiber
Fiber content: 20% (in weight)
Prepreg thickness: 0.25 mm
Number of laminated prepregs: 12 sheets
Thickness of laminated article: 3 mm
Heating temperature: 250° C. for 5 minutes
Resin viscosity at the heating temperature: 1500 poise In this comparative example, the fiber content was not more than 30%, so that the laminated article could not maintain a constant shape during the molding steps, and an expected molded product corresponding to the outer shape of the molding tool could not be obtained.

[COMPARATIVE EXAMPLE 2]

A laminated molded product was produced in the same manner as Example 1 on the basis of the following production conditions.

[Production Conditions]
Thermoplastic resin: polypropylene
Reinforcing fiber: glass fiber
Fiber content: 50% (in weight)
Prepreg thickness: 1.5 mm
Number of laminated prepregs: 2 sheets
Thickness of laminated article: 3 mm
Heating temperature: 250° C. for 5 minutes
Resin viscosity at the heating temperature: 1500 poise In this comparative example, the prepreg used was too thick, so that molding could not be performed well, and surfaces of a laminated molded product became uneven.

[COMPARATIVE EXAMPLE 3]

A laminated molded product was produced in the same manner as Example 1 on the basis of the following production conditions.

[Production Conditions]
Thermoplastic resin: polypropylene
Reinforcing fiber: glass fiber
Fiber content: 50% (in weight)
Prepreg thickness: 0.25 mm
Number of laminated prepregs: 12 sheets
Thickness of laminated article: 3 mm
Heating temperature: 250° C. for 5 minutes
Resin viscosity at the heating temperature: 50 poise In this comparative example, the resin viscosity was too low, so that the melted resin flew and fell from the reinforcing fiber, and it was impossible to produce a laminated molded product corresponding to the outer shape of the molding tool.

[COMPARATIVE EXAMPLE 4]

A laminated molded product was produced in the same manner as Example 1 on the basis of the following production conditions.

[Production Conditions]
Thermoplastic resin: polypropylene
Reinforcing fiber: glass fiber
Fiber content: 50% (in weight)
Prepreg thickness: 0.25 mm
Number of laminated prepregs: 12 sheets
Thickness of laminated article: 3 mm
Heating temperature: 250° C. for 5 minutes
Resin viscosity at the heating temperature: 5500 poise In this comparative example, the resin viscosity was too high, so that the laminated article in which the resin was melted could not be allowed to follow the molding article, and it was impossible to produce a laminated molded product corresponding to the outer shape of the molding tool.

[EXAMPLE 2]

Figure 7:
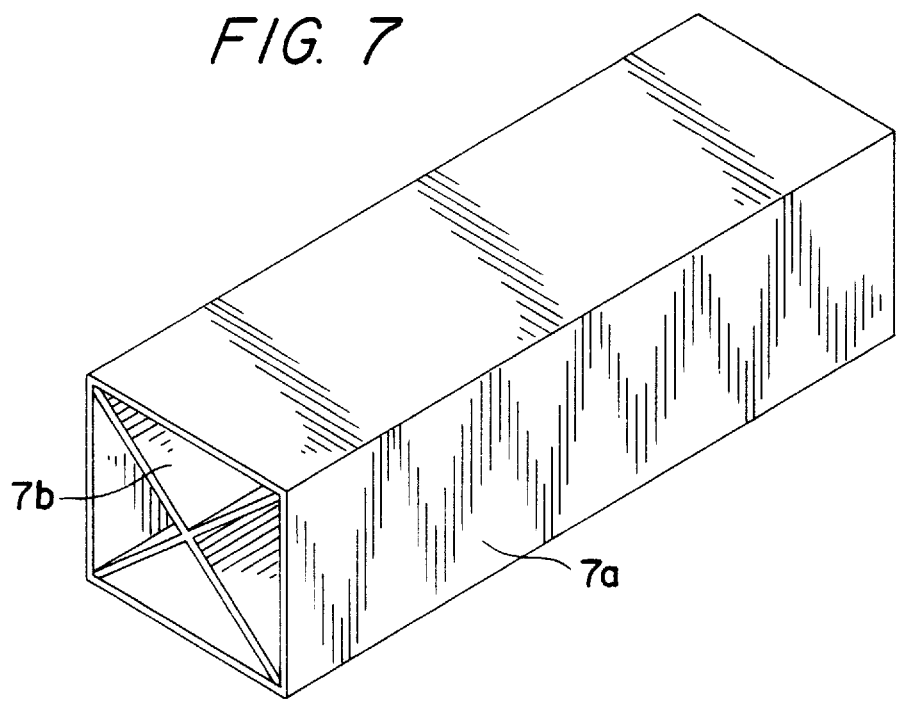
FIG. 7 is a cross-sectional view showing a square cylindrical molding tool having diagonal braces at the inside.

A molding tool shown in FIG. 7, in which a hollow square pole made of a thin iron plate 7a was reinforced with an iron diagonal brace 7b, was used to mold a laminated article under the same conditions as those in Example 1, and a structure was produced without withdrawing the molding tool and cooling was performed as it was.

The structure produced in this example was one in which the laminated molded product was combined with the molding tool, so that in this method, as compared with a case being produced entirely from iron plates, a structure having a light weight and high rigidity was obtained.

[EXAMPLE 3]

Figure 8:
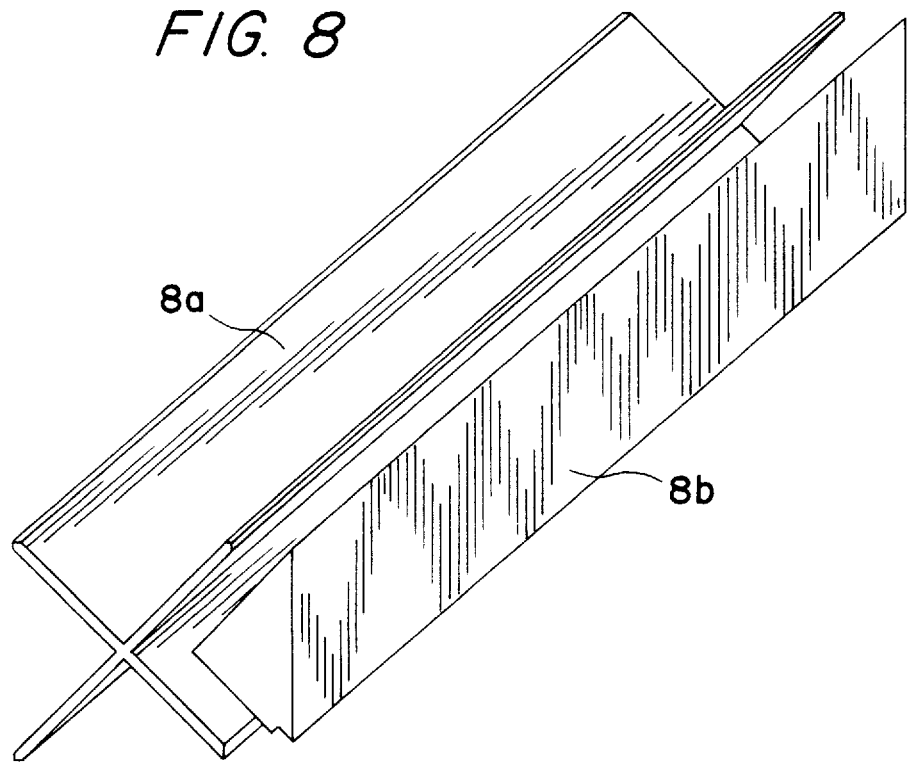
FIG. 8 is a perspective view showing a molding tool used in another embodiment according to the present invention.
Figure 9:
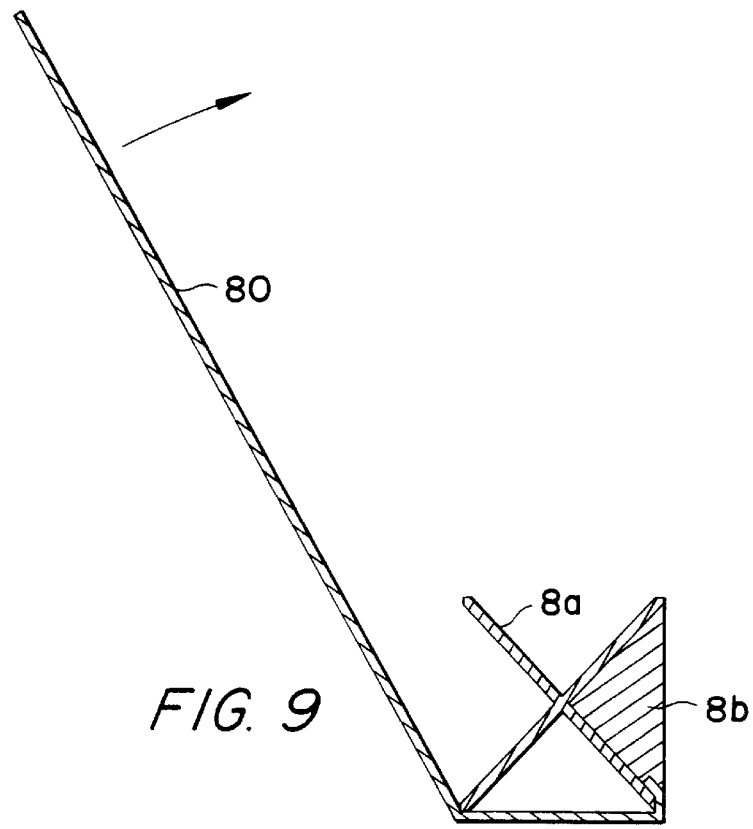
FIG. 9 is a cross-sectional view showing a method for winding a laminated article around the molding tool in FIG. 8.
Figure 10:
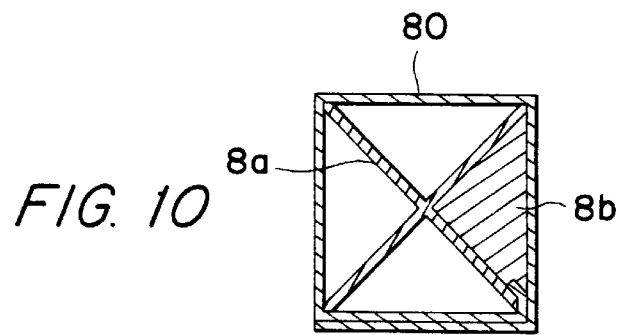
FIG. 10 is a cross-sectional view showing a state in which the winding of the laminated article around the molding tool in FIG. 8 is completed.

In this example, a molding tool shown in FIG. 8 was used, the tool comprises a diagonal brace 8a made of iron plates having a cross-section of a cross shape, and a temporary fastening member 8b having a shape of an approximately rectangular pole which is adapted to be generally closely contacted with and accommodated in any one of grooves having a rectangular cross-section of the diagonal brace 8a and has a step portion which can form a gap having a constant depth between it and any one of side edges of the diagonal brace 8a with which it contacts in the case of accommodation in the groove. In this case, one side edge of a preheated laminated article 80 similar to that in Example 1 was hooked to one side edge of the diagonal brace 8a, on which the temporary fastening member 8b was fitted so as to allow one side edge of the laminated article 80 to contact with the step portion of the temporary fastening member 8b to secure the laminated article 80, and as shown in FIG. 9, the laminated article 80 was wound around the diagonal brace 8a while applying constant tensile force until its free end was made to overlap as shown in FIG. 10, the overlapped portions were allowed to adhere under a pressure followed by cooling, and the temporary fastening member 8b was withdrawn to produce a structure having the diagonal brace 8a.

The structure produced in this example was one in which the laminated molded product was combined with the diagonal brace having the cross-section of a cross shape, so that in this method, the structure was obtained which had a weight lighter than that of the structure of Example 2, and had rigidity equivalent to that of the structure.

[EXAMPLE 4]

Figure 11:
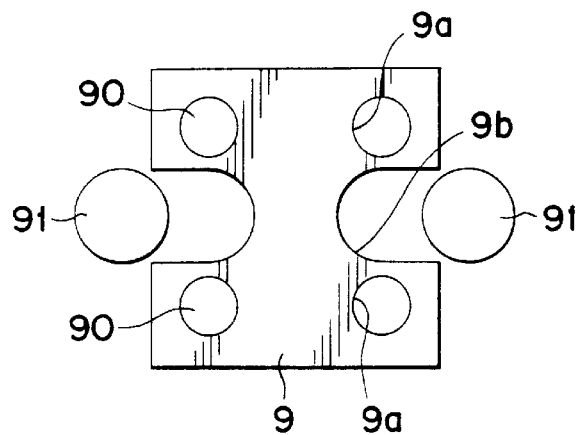
FIG. 11 is a front view of a molding tool used in still another embodiment according to the present invention.
Figure 12:
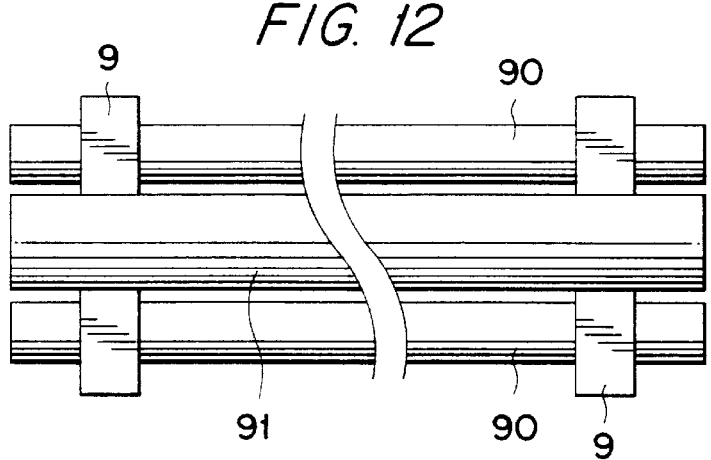
FIG. 12 is a side view thereof.
Figure 13:
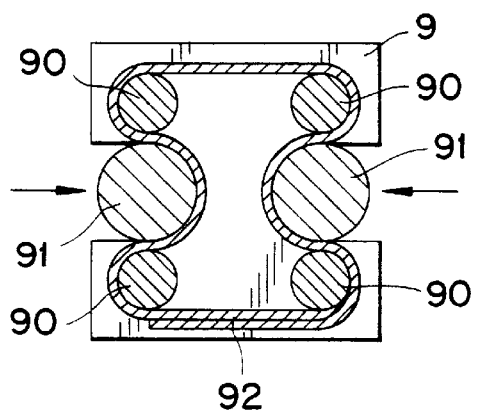
FIG. 13 is a cross-sectional view showing a method for winding a laminated article around the molding tool shown in FIG. 11 and FIG. 12 so as to perform molding.
Figure 14:
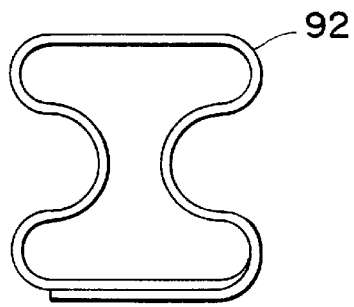
FIG. 14 is a view of an end face of a laminated molded article produced using the molding tool.

In this example, a molding tool shown in FIG. 11 was used. This molding tool comprises support frames 9 constituted by two sheets of opposing rectangular plates formed with circular holes 9a at four corners and formed with cut-out portions 9b at a pair of opposing sides. Further, the molding tool comprises four support round rods 90 made of stainless steel which have both ends supported by the circular holes 9a at the four corners of the support frames 9 in a manner freely capable of attachment and detachment, and movable round rods 91 which were fitted to the cut-out portions 9b of the support frames 9 in parallel to the support round rods 90 supported by the support frames 9. A preheated laminated article 92 similar to that in Example 1 was wound around the four support round rods 90 supported by the support frames 9 while applying constant tensile force until its side edges were overlapped with each other as shown in FIG. 13, the movable round rods 91 were fitted to the cut-out portions 9b of the support frames 9 followed by cooling, the support round rods 90 were withdrawn, and the movable round rods 91 were moved backwardly to produce a laminated molded product having a cross-section of a different shape as shown in FIG. 14.

In this example, good laminated molded product was obtained.

The present invention as described above, provides a laminated molded product and its production method. The laminated molded product according to the present invention can be a hollow laminated molded product composed of fiber-reinforced thermoplastic resin plates produced by simplified processing steps without using bolts and nuts or an adhesive, and without deteriorating the strength of the joining face.

What is claimed is:

1. A method for preparing a molded article comprising:
   providing a first prepreg comprised of a fiber-reinforced thermoplastic resin containing reinforcing fibers in an amount of not less than 30% and not more than 85% by weight in contact with part of a molding surface of a molding tool having a desired cross-sectional shape;
   providing a separate second prepreg comprised of a fiber-reinforced thermoplastic resin containing reinforcing fibers in an amount of not less than 30% and not more than 85% by weight in contact with two side edge portions of said first prepreg and part of the molding surface of said molding tool not covered by said first prepreg so as to form a shell surrounding said molding tool;
   molding said first and second fiber-reinforced thermoplastic resin prepregs at a temperature above the glass transition temperature of the thermoplastic resin of said first and second fiber-reinforced thermoplastic resin prepregs so that said first and second fiber-reinforced thermoplastic resin prepregs conform to the desired cross-sectional shape of said molding tool and so that the second fiber-reinforced thermoplastic resin prepreg is adhered to the side edge portions of the first fiber-reinforced thermoplastic resin prepreg to form a molded article, said side edge portions being sufficient so that the first and second fiber-reinforced thermoplastic resin prepregs can be adhered together so as to form the molded article in hollow form; and
   cooling said molded article.

2. The method of claim 1 wherein the molding tool is withdrawn after the molded article is cooled.

3. The method of claims 1 wherein the molding tool has at least a pair of opposing parallel sides.

4. The method of claim 1 wherein the viscosity of the thermoplastic resin of said first and second fiber-reinforced thermoplastic resin prepregs is in the range of 100 to 5000 poise when said first and second fiber-reinforced thermoplastic resin prepregs are molded to conform to said molding tool and when said first and second fiber-reinforced thermoplastic resin prepregs are adhered to form said molded article.

5. The method of claim 1 wherein the first and second fiber-reinforced thermoplastic resin prepregs are molded by a second molding tool which contacts the first fiber-reinforced thermoplastic resin prepreg and presses the first fiber-reinforced thermoplastic resin prepreg against said molding tool having the desired cross-sectional shape and a third molding tool which contacts the second fiber-reinforced thermoplastic resin prepreg and presses the second fiber-reinforced thermoplastic resin prepreg against said molding tool having the desired cross-sectional shape.

6. The method of claim 1 wherein said molding tool having the desired cross-sectional shape is hollow and has a plurality of venting holes and wherein compressed air is supplied through the venting holes to form an air layer between the outer surface of said molding tool having the desired cross-sectional shape and an inner circumferential face of the molded article so as to release the molded article from the outer peripheral surface of said molding tool having the desired cross-sectional shape, and thereafter said molding tool having the desired cross-sectional shape is withdrawn.

7. A hollow molded article comprised of a first fiber-reinforced thermoplastic resin prepreg having side edge portions and containing reinforcing fibers in an amount of not less than 30% and not more than 85% by weight and a separate second fiber-reinforced thermoplastic resin prepreg having portions and containing reinforcing fibers in an amount of not less than 30% and not more than 85% by weight, said side edge portions of said first and second fiber-reinforced thermoplastic resin prepregs being overlapped and adhered by heat and pressure so as to form a hollow molded article having a desired cross-sectional shape.

8. The molded article of claim 7 wherein said first and second fiber-reinforced thermoplastic resin prepregs contain fibers stretched and aligned in one direction whereby the fibers are substantially parallel.

9. The molded article of claim 7 wherein said first and second fiber-reinforced thermoplastic resin prepregs contain fibers in the form of a woven cloth.

10. The molded article of claim 7 wherein said first and second fiber-reinforced thermoplastic resin prepregs have a thickness in the range of 0.05 to 1 mm.

11. The molded article of claim 7 wherein the thermoplastic resin of said first and second fiber-reinforced thermoplastic resin prepregs is polypropylene.

* * * * *